US009507368B2

(12) United States Patent
Ito et al.

(10) Patent No.: US 9,507,368 B2
(45) Date of Patent: Nov. 29, 2016

(54) ELECTRIC POWER CONTROL APPARATUS

(71) Applicants: DENSO CORPORATION, Kariya, Aichi-pref. (JP); AVAL NAGASAKI CORPORATION, Isahaya, Nagasaki-pref. (JP)

(72) Inventors: Akira Ito, Nukata-gun (JP); Hiroshi Muneishi, Nagasaki (JP)

(73) Assignees: DENSO CORPORATION, Kariya (JP); AVAL NAGASAKI CORPORATION, Isahaya (JP)

( * ) Notice: Subject to any disclaimer, the term of this patent is extended or adjusted under 35 U.S.C. 154(b) by 536 days.

(21) Appl. No.: 13/944,045

(22) Filed: Jul. 17, 2013

(65) Prior Publication Data

US 2014/0025214 A1 Jan. 23, 2014

(30) Foreign Application Priority Data

Jul. 23, 2012 (JP) ................... 2012-162552

(51) Int. Cl.
| | |
|---|---|
| G05F 5/00 | (2006.01) |
| B60W 10/26 | (2006.01) |
| H02J 3/32 | (2006.01) |
| H02J 7/14 | (2006.01) |

(52) U.S. Cl.
CPC ............. *G05F 5/00* (2013.01); *B60W 10/26* (2013.01); *H02J 3/32* (2013.01); *H02J 7/14* (2013.01)

(58) Field of Classification Search
CPC ........ G05F 5/00; Y02T 10/7005; H02J 7/00; H02J 7/04; H02J 7/14; H02J 7/0027; H02J 3/28; H02J 3/32; G06F 1/26; G06F 1/28; B60W 10/24; B60W 10/26

USPC .......................... 700/286, 291, 295
See application file for complete search history.

(56) References Cited

U.S. PATENT DOCUMENTS

| | | | | | |
|---|---|---|---|---|---|
| 6,404,163 | B1* | 6/2002 | Kapsokavathis | ..... | H02J 7/0029 320/104 |
| 7,849,944 | B2* | 12/2010 | DeVault | ................. | B60K 6/365 180/65.265 |

(Continued)

FOREIGN PATENT DOCUMENTS

| | | |
|---|---|---|
| JP | 2008-067481 A | 3/2008 |
| JP | 2008-141918 A | 6/2008 |

OTHER PUBLICATIONS

"Development of BEMS Energy Management Method," Annual Meeting of 2012, Japan Society of Mechanical Engineers.

*Primary Examiner* — Charles Kasenge
(74) *Attorney, Agent, or Firm* — Posz Law Group, PLC

(57) ABSTRACT

A power control apparatus includes: a power supply device including multiple power supply elements; a power consumption device; a battery independently arranged from the power supply device and the power consumption device; a supply and consumption balance adjustment device for controlling the power supply device and the battery to supply the electric power to the power consumption device; a prediction device for predicting electric power supply from at least a part of multiple power supply elements and electric power consumption of the power consumption device; a guard value setting device for setting a guard value of a charging and discharging operation of the battery according to a prediction result of the prediction device; and an output device for outputting the guard value to the supply and consumption balance adjustment device.

15 Claims, 5 Drawing Sheets

(56) References Cited

U.S. PATENT DOCUMENTS

| | | | | |
|---|---|---|---|---|
| 8,063,609 B2* | 11/2011 | Salasoo | | B60L 3/0046 320/103 |
| 8,560,135 B2* | 10/2013 | Tomita | | H02J 3/32 700/291 |
| 8,571,720 B2* | 10/2013 | Yonezawa | | H02J 3/14 700/291 |
| 8,744,641 B2* | 6/2014 | Ito | | H02J 3/32 700/291 |
| 8,766,595 B2* | 7/2014 | Gaul | | B60L 11/1838 320/104 |
| 9,143,008 B2* | 9/2015 | Aisu | | H02J 13/0086 |
| 2005/0228553 A1* | 10/2005 | Tryon | | B60K 6/46 701/22 |
| 2008/0021628 A1* | 1/2008 | Tryon | | B60K 6/46 701/99 |
| 2009/0192655 A1 | 7/2009 | Ichikawa et al. | | |
| 2010/0019718 A1* | 1/2010 | Salasoo | | B60L 3/0046 320/103 |
| 2010/0076825 A1 | 3/2010 | Sato et al. | | |
| 2010/0138092 A1* | 6/2010 | Kohn | | H02J 7/0091 701/22 |
| 2010/0235025 A1* | 9/2010 | Richter | | B60L 11/1824 701/22 |
| 2010/0235030 A1* | 9/2010 | Xue | | B60L 7/12 701/22 |
| 2011/0184584 A1* | 7/2011 | Ukita | | H04L 67/24 700/297 |
| 2011/0238232 A1* | 9/2011 | Tomita | | H02J 3/32 700/291 |
| 2012/0065792 A1* | 3/2012 | Yonezawa | | H02J 3/14 700/291 |
| 2012/0249057 A1* | 10/2012 | Abe | | H02J 7/041 320/107 |
| 2012/0323386 A1* | 12/2012 | Ito | | H02J 3/32 700/291 |
| 2013/0024035 A1 | 1/2013 | Ito et al. | | |

\* cited by examiner

ELECTRIC POWER CONTROL APPARATUS

CROSS REFERENCE TO RELATED APPLICATION

This application is based on Japanese Patent Application No. 2012-162552 filed on Jul. 23, 2012, the disclosure of which is incorporated herein by reference.

TECHNICAL FIELD

The present disclosure relates to an electric power control apparatus that controls power according to a result of prediction processing on at least one of supply of power by at least a part of a supply device and consumption of power by a demand device.

BACKGROUND

A control apparatus of this type is proposed, for example, in Patent Document 1 specified below. This control apparatus is configured in such a manner that a charge and discharge schedule is determined on the basis of a prediction on power demand of a house that can receive power from and send power to an in-vehicle battery and according to an evaluation function by which evaluation becomes higher as a $CO_2$ emission and power costs become lower and charging and discharging of a vehicle is instructed according to the schedule thus determined.

It should be noted, however, that the control apparatus of a type configured so as to determine a charge and discharge schedule on the basis of the prediction as above possibly has an inconvenience that the control apparatus fails to maintain a balance between supply and demand when the prediction turns out to be incorrect.

Patent Document 1: JP-A-2008-54439 (i.e., US 2009/192655)

SUMMARY

It is an object of the present disclosure to provide an electric power control apparatus that controls power according to a result of prediction device on at least one of supply of power by at least a part of a power supply elements and consumption of power by a consumption device.

According to an example aspect of the present disclosure, a power control apparatus includes: a power supply device for supplying an electric power, the power supply device including a plurality of power supply elements; a power consumption device for consuming the electric power; a battery independently arranged from the power supply device and the power consumption device; a supply and consumption balance adjustment device for controlling the power supply device and the battery to supply the electric power to the power consumption device; a prediction device for predicting at least one of electric power supply from at least a part of the plurality of power supply elements and electric power consumption of the power consumption device; a guard value setting device for setting a guard value of a charging and discharging operation of the battery according to a prediction result of the prediction device; and an output device for outputting the guard value to the supply and consumption balance adjustment device.

In the above apparatus, the supply and consumption balance adjustment device can make an adjustment of power that is appropriate in a scale of a prediction period of the prediction device. Further, the apparatus can avoid such an inconvenience by giving a command value of the charge and discharge power to the supply and consumption balance adjustment device as the guard value.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

Hereinafter, a first embodiment in which a power control apparatus of the disclosure is applied to a power control apparatus installed in a store will be described with reference to the drawings.

Figure 1:
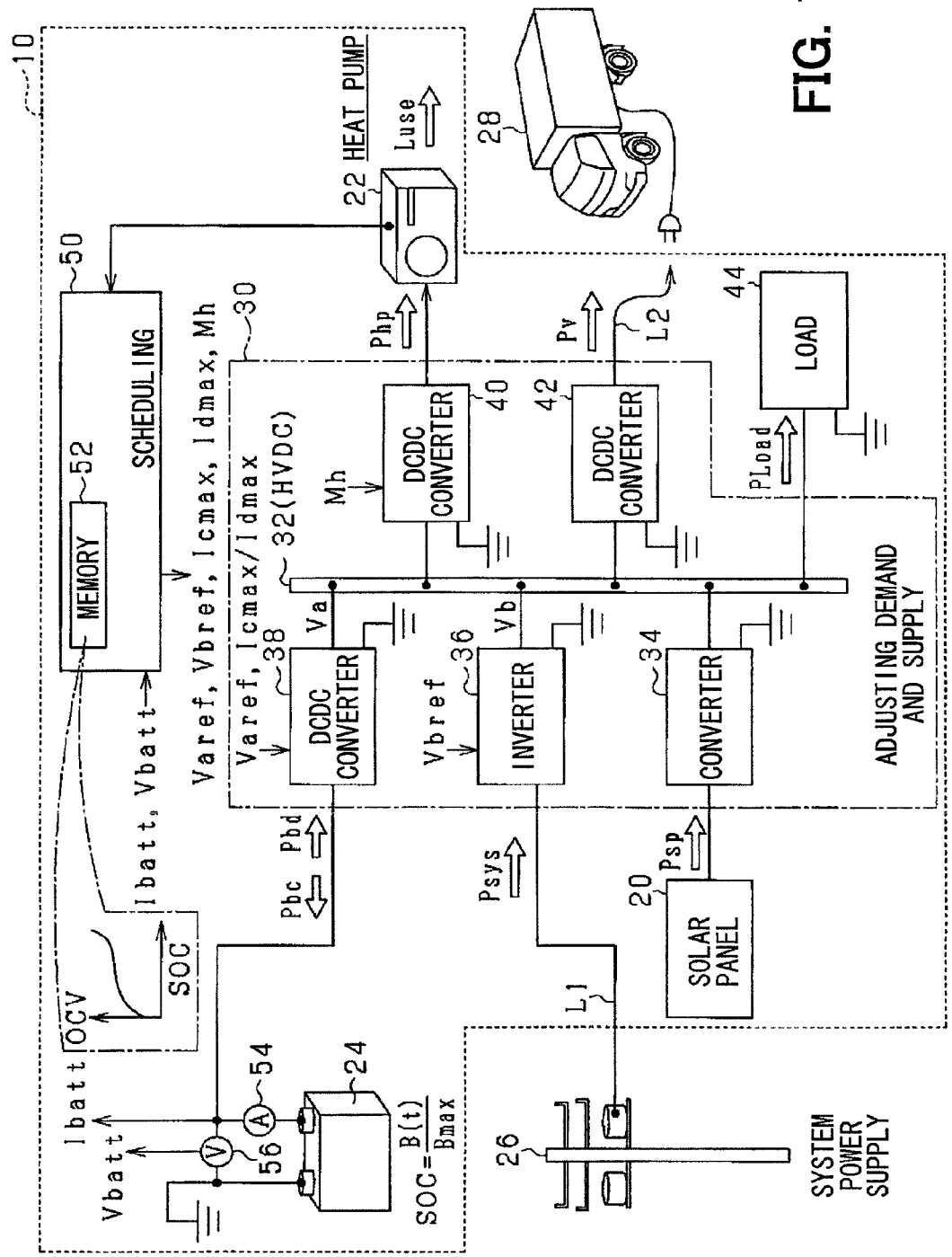
FIG. 1 is a view showing a system configuration of a first embodiment.

A system 10 shown in FIG. 1 is a subject to which this embodiment is applied. Herein, the system 10 is assumed to be a system equipped to a store.

The system 10 includes, as supply device that is device on a power supply side, a solar panel 20 and a line L1 connected to a commercial power supply (system power supply 26) on the outside of the system 10. The line L1 itself does not generate power. However, the line L1 is an introduction device for introducing power on the outside of the system 10 (power supplied by the system power supply 26) into the system 10 and therefore serves as the supply device on the supply side in the system 10.

On the other hand, a heat pump 22, a line L2, and a load 44 are provided as demand device on a power demand side in the system 10. The line L2 is a transmission device for transmitting power to a mobile object (commercial vehicle 28) on the outside of the system 10. Incidentally, an ideal power consumption rate across the line L2 is zero. The line L2, however, serves as device on the side from which power is withdrawn from within the system 10 by transmitting the power to the outside of the system 10. It should be noted that the line L1 also serves as the demand device in the case of reverse power flow from the system 10 to the system power supply 26.

Besides the supply mean and the demand device, the system 10 includes a secondary battery (battery 24) as a capacitor device. In this embodiment, the battery 24 is assumed to be a lithium-ion secondary battery.

A supply and demand balance adjustment portion 30 is furnished with a function of maintaining a balance between supply and demand by covering power to be supplied to the demand device by power of the supply device. In particular, the supply and demand balance adjustment portion 30 operates a charge and discharge amount of the battery 24 and a power supply amount from the system power supply 26 to maintain a balance between supply and demand of power within the system 10.

More specifically, the supply and demand balance adjustment portion 30 includes a DC bus line (HVDC standing for High Voltage Direct Current) 32 so that power is sent and received through the supply and demand balance adjustment portion 30 via the DC bus line 32. That is to say, generation power Psp of the solar panel 20 is boosted by a solar converter 34 and outputted to the DC bus line 32. Also, power Psys supplied from the system power supply 26 is converted to DC power by a system inverter 36 and outputted to the DC bus line 32. Further, discharge power Pbd of the battery 24 is outputted to the DC bus line 32 through a DCDC converter 38.

Meanwhile, power of the DC bus line 32 is inputted into the battery 24 as charge power Pbc of the battery 24 through the DCDC converter 38. Also, power Php of the DC bus line 32 is outputted to the heat pump 22 through a heat pump converter 40. In this embodiment, the heat pump 22 is assumed to have an interface with which two-valued operations including a drive state and a stop state can be controlled by an external controller. Hence, while the heat pump 22 is in a drive state, constant power Php is outputted from the heat pump converter 40 to the heat pump 22. Further, power of the DC bus line 32 is outputted to the line L2 through the charge converter 42 and supplied to the commercial vehicle 28 via the line L2. The commercial vehicle 28 may be a vehicle provided with an electrical freezer under contract with the store or an electrical vehicle under contract that the electrical vehicle is entitled to supply of power after delivery of the goods to the store. In addition, power PLoad of the DC bus line 32 is outputted to the load 44.

In the configuration as above, a balance between supply and demand within the system 10 is maintained by determining the charge power Pbc (discharge power Pbd) of the battery 24 and power of the system power supply 26. To this end, the supply and demand balance adjustment portion 30 of this embodiment uses a voltage value of the DC bus line 32 as information on a bias to either supply or demand within the system 10. This configuration intends to make neither information communications nor collaborative control necessary among the involved control device of the power (the DCDC converter 38, the system inverter 36, and the solar converter 34) when power to be supplied to the demand device is supplied by the battery 24, the system power supply 26, and the solar panel 20.

In other words, at the end of the demand device, the power Php is determined as the heat pump converter 40 is driven according to a request from the heat pump 22, the power Pv outputted from the charge converter 42 is determined according to a charge request from the commercial vehicle 28, and the PLoad is determined according to a request from the load 44.

On the contrary, at the end of the supply device, the generation power Psp of the solar panel 20 is determined by itself, for example, by known MPPT (Maximum Power Point Tracking) control. On the other hand, the charge power Pbc and the discharge power Pbd of the battery 24 and further the power Psys of the system power supply 26 are determined according to an actual voltage Vhvdc across the DC bus line 32. The voltage Vhvdc is a parameter correlated to a bias of the balance between supply and demand of power within the system 10 and the supply and demand balance adjustment portion 30 uses the voltage Vhvdc as information on a bias of a balance between supply and demand.

More specifically, the DCDC converter 38 is a bidirectional converter, for example, a known step-up and -down chopper circuit. Whether the system 10 is in a discharge state in which power is discharged from the battery 24 to the DC bus line 32 or a charge state in which power is charged to the battery 24 from the DC bus line 32 is determined depending on which of an output voltage Va across the DCDC converter 38 and the voltage Vhvdc is the larger or the smaller. Likewise, the system inverter 36 is a bidirectional power conversion circuit in which a step-up and -down chopper circuit or the like is connected to an output stage of a known DCAC conversion circuit. Whether power is supplied from the system power supply 26 to the DC bus line 32 or stopped (reverse power flow in some cases) is determined depending on which of the output voltage Vb across the system inverter 36 and the voltage Vhvdc is the larger or the smaller. This configuration is achieved by performing introduction processing of power from the system power supply 26 using a DCAC conversion circuit at an input stage when power is outputted from the step-up and—down chopper circuit to the DC bus line 32.

The output voltage Va across the DCDC converter 38 and the output voltage Vb across the system inverter 36 are set by a scheduler 50 shown in FIG. 1. In other words, the scheduler 50 sets a battery-side command voltage Varef and a system-side command voltage Vbref as an operation amount to minimize the cost incurred in the system 10 by supplying power from the system power supply 26. The DCDC converter 38 and the system inverter 36 control the own output voltages Va and Vb to be the battery-side command voltage Varef and the system-side command voltage Vbref, respectively.

More specifically, in this embodiment, the system power supply 26 and the solar panel 20 are assumed to be device for supplying power into the system 10. In a case where power is supplied from the system power supply 26 via the line L1, the cost (electricity charges) is incurred according to the supply. The line L1 is therefore a paid supply device that incurs the cost in the system 10. On the contrary, the solar panel 20 supplies the system 10 with the generation power Psp free of charge by ignoring an initial investment to purchase the solar panel 20 and the wearing thereof and is therefore a free supply device. Accordingly, the scheduler 50 performs processing (optimum search processing) to search for the charge power Pbc and the discharge power Pbd that minimize the cost incurred by supplying power from the system power supply 26. Incidentally, by minimizing the cost, an amount of usage of the generation power Psp of the solar panel 20 can be increased. This embodiment therefore aims at increasing an amount of usage of renewable energy and hence aims at so-called local production for local consumption by which energy generated within the system 10 is consumed to the extent possible.

Figure 2:
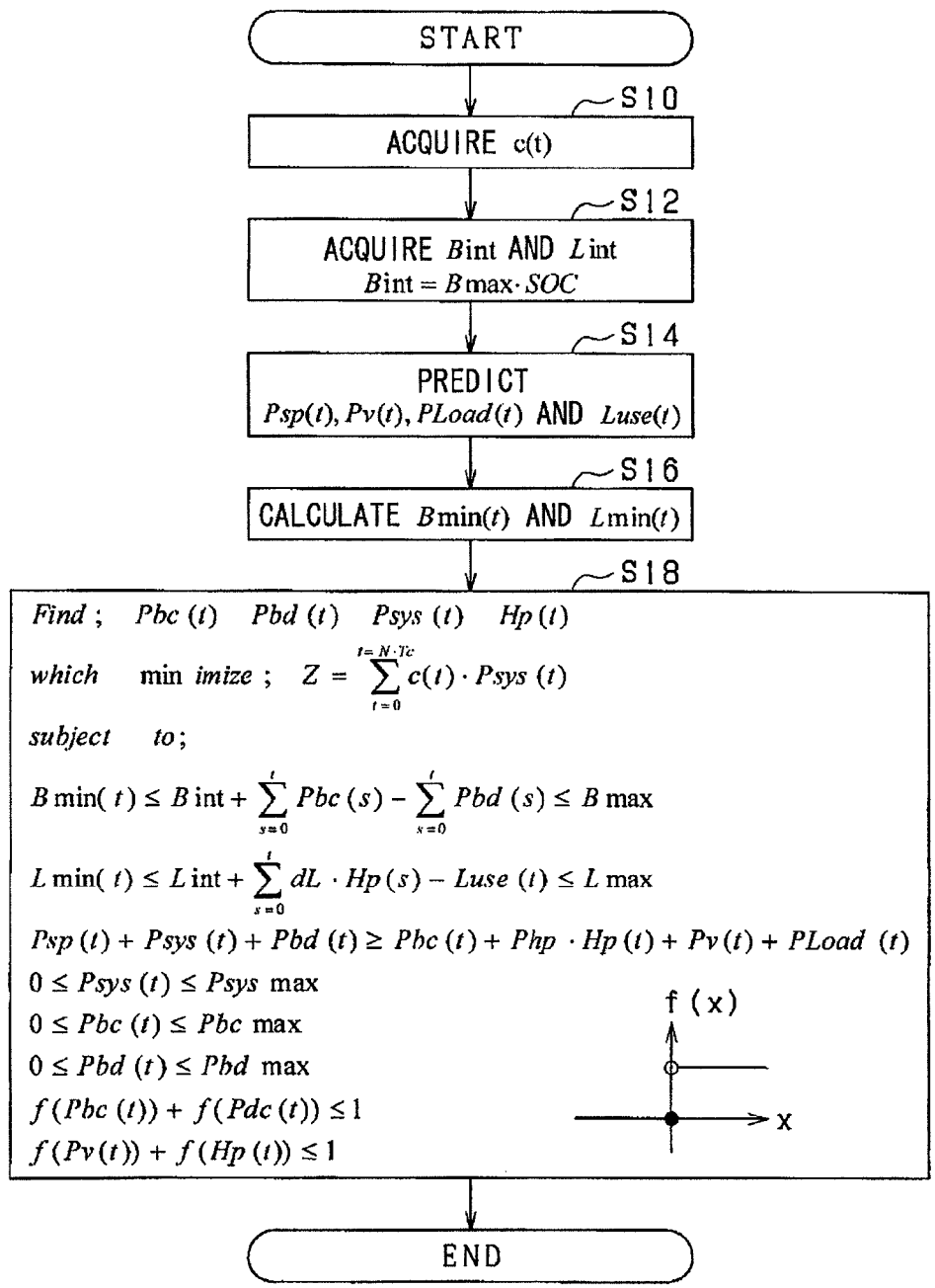
FIG. 2 is a flowchart depicting a procedure of optimum search processing in the first embodiment.

FIG. 2 depicts the optimum search processing performed by the scheduler 50. This processing is repetitively performed in a control cycle Tc (assumed to be one hour herein).

In a series of the processing steps, information on the cost $c(t)$ of power supplied from the system power supply 26 is acquired first at Step SW. The "cost (c)" referred to herein fluctuates from time zone to time zone, for example, by becoming cheaper late at night than in the daytime on weekdays and is therefore a function of time. This processing may be processing to retrieve information from the power company via a communication line or processing to request the user to input information so as to acquire the information thus inputted.

Information on a current charge amount Bint of the battery 24 and a current hot-water storage amount Lint of the heat pump 22 is acquired at subsequent Step S12. The charge amount Bint is obtained by multiplying a current state of charge (SOC) of the battery 24 by a full charge amount Bmax. Also, the state of charge is calculated by a known method according to a charge and discharge current Ibatt of the battery 24 detected by a current sensor 54 or a terminal voltage Vbatt across the battery 24 detected by a voltage sensor 56. On the contrary, the hot-water storage amount Lint is provided from the heat pump 22.

Processing to predict the generation power Psp(t) of the solar panel 20, the charge power Pv(t) of the commercial vehicle 28, the power PLoad(t) consumed by the load 44, and an amount of used hot-water, Luse(t), of the heat pump 22 is performed at subsequent Step S14. Prediction processing for the generation power Psp(t) of the solar panel 20 is performed, for example, on the basis of weather forecast acquired via the communication line. Alternatively, the scheduler 50 may make a prediction about the weather by itself on the basis of a detection value of atmosphere to predict the generation power Psp(t) on the basis of the predicted weather.

Meanwhile, the charge power Pv(t) of the commercial vehicle 28 is predicted on the basis of a history of the charge power in the past. This prediction can be made by storing a charge power and a time during a predetermined period in the past into a memory 52 provided to the scheduler 50 each time the commercial vehicle 28 is actually charged. More specifically, for example, an average value of the charge power at each time in the past several days and a standard deviation are calculated and a prediction value of the charge power Pv(t) at a given time is found by adding the standard deviation to the average value. The predetermined period is preferably a period longer than a prediction period.

Also, the power PLoad (t) consumed by the load 44 can be predicted on the basis of a history of the power consumption in the past. This processing can be also performed by storing power consumption from time to time during a predetermined period in the past into the memory 52. Further, the amount of used hot water, Luse(t), of the heat pump 22 can be predicted on the basis of a history of used hot water in the past. This processing can be also performed by storing an amount of used hot water from time to time during a predetermined period in the past into the memory 52.

A lower limit value Bmin(t) of power of the battery 24 and a lower limit value Lmin(t) of the hot-water storage amount of the heat pump 22 are calculated at subsequent Step S16. The lower limit value Bmin(t) is set high enough to cover all the charge power Pv(t) predicted at Step S14 by the battery 24. The reason underlying this configuration is to prepare the battery 24 with a charge amount enough to supply the commercial vehicle 28 with power comparable to the charge power Pv(t) and to set the lower limit value Lmin(t) to a value down to the extent to which the heat pump 22 can supply an amount of used hot water, Luse(t), predicted at Step S14.

The charge power Pbc(t), the discharge power Pbd(t), the power Psys(t), and an operation command value Hp(t) of the heat pump 22 to minimize the cost incurred by receiving supply of power from the system power supply 26 are searched for at subsequent Step S18 on the basis of a result of the prediction processing at Step S14. This search is performed by linear programming in this embodiment. More specifically, this search is performed by searching for a value that minimizes an object function Z expressed by Equation (c1) below under constrained conditions expressed by Equations (c2) through (c9) below using mixed integer programming.

Mathematical Formula 1

$$Z = \sum_{t=0}^{t=N \cdot Tc} c(t) \cdot Psys(t) \quad (c1)$$

$$Bmin(t) \leq Bint + \sum_{s=0}^{t} Pbc(s) - \sum_{s=0}^{t} Pbd(s) \leq Bmax \quad (c2)$$

$$Lmin(t) \leq Lint + \sum_{s=0}^{t} dL \cdot Hp(s) - Luse(t) \leq Lmax \quad (c3)$$

$$Psp(t) + Psys(t) + Pbd(t) \geq Pbc(t) + Php \cdot Hp(t) + Pv(t) + PLoad(t) \quad (c4)$$

$$0 \leq Psys(t) \leq Psysmax \quad (c5)$$

$$0 \leq Pbc(t) \leq Pbcmax \quad (c6)$$

$$0 \leq Pbd(t) \leq Pbdmax \quad (c7)$$

$$f(Pbc(t)) + f(Pdc(t)) \leq 1 \quad (c8)$$

$$f(Pv(t)) + f(Hp(t)) \leq 1 \quad (c9)$$

Equation (c1) above shows an example where the object function Z is constructed as a sum of products of the cost c(t) and the power Psys(t) during a prediction period (0 to N·Tc). The prediction period in this embodiment is set to a time longer than the processing cycle (control cycle Tc) of FIG. 2. In particular, the processing cycle is assumed to be 24 hours in this embodiment. The reason underlying this assumption is that a fluctuation cycle of the cost c(t) of the power of the system power supply 26 is set to one day (24 hours).

Equation (c2) above expresses the constraint condition on a charged amount of the battery 24 and Equation (c3) above expresses the constraint condition on an amount of used hot water of the heat pump 22. Incidentally, the command value Hp shifts to "1" when the heat pump 22 is driven and to "0" otherwise. Also, Equation (c3) above uses an increased amount dL in the hot-water storage amount per unit time when the heat pump 22 is driven.

Meanwhile, Equation (c4) above expresses the constraint condition on a relation between supply and demand. In this embodiment, this constraint condition is given as a condition to make supply power equal to or higher than demand power (prediction value thereof). Equation (c5) above expresses the constraint condition on the contraction of use of the system power supply 26. In short, because available power of the system power supply 26 has a contractual upper limit value Psysmax, the supply power is prevented from exceeding the upper limit value Psysmax. Also, Equation (c6) above expresses the constraint condition on the charge power Pbc(t) of the battery 24 and Equation (c7) above expresses the constraint contract on the discharge power Pbd(t) of the battery 24. These conditions are to prevent the charge power Pbc(t) and the discharge power Pbd(t) from exceeding the corresponding upper limit values of the power determined by the specification of the battery 24. The upper limit values of the charge and discharge power of the battery 24 are pre-stored in the memory 52 of the scheduler 50.

Meanwhile, Equation (c8) above expresses that the battery 24 cannot be charged and discharged at the same time in the form of a function f that takes "1" when an independent variable is positive and "0" when the independent variable is zero or less. Also, Equation (c9) above expresses a condition that inhibits charging of the commercial vehicle 28 and driving of the heat pump 22 at the same time. This condition aims at lowering the contractual upper limit value Psysmax of the system power supply 26 by lowering the maximum value of power consumption within the system 10.

The processing at Step S18 forms an optimum value search device in this embodiment. When this processing is completed, a series of the processing steps depicted in FIG. 2 is ended.

Figure 3:
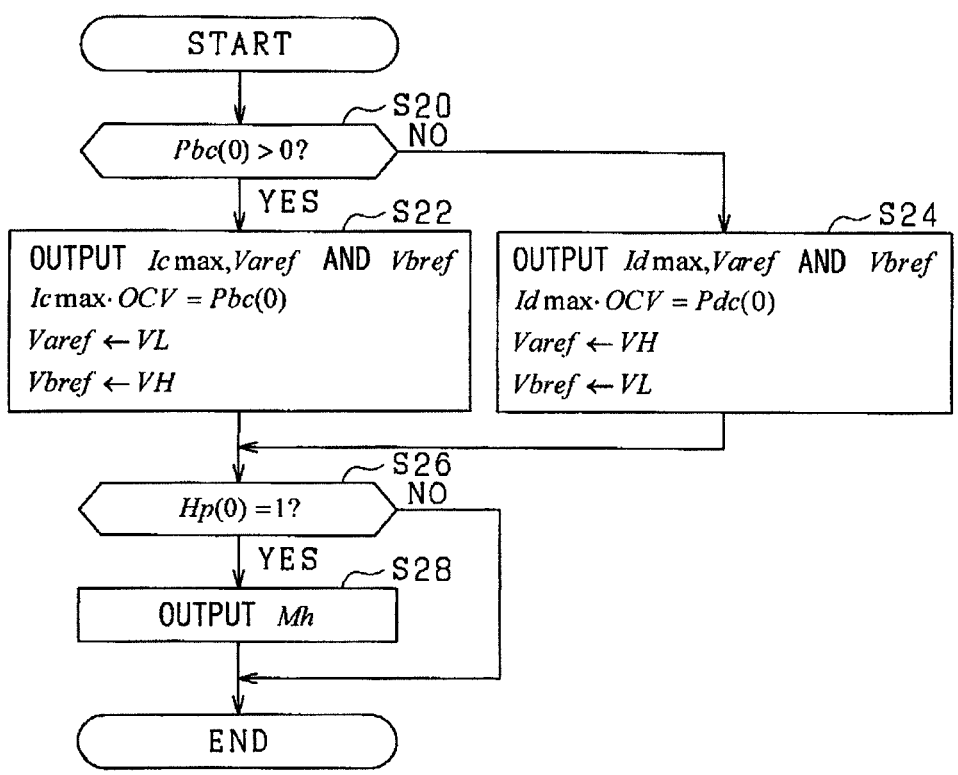
FIG. 3 is a flowchart depicting a procedure of calculation processing of a guard value in the first embodiment.

FIG. 3 depicts processing to generate a command signal outputted from the scheduler 50 to the supply and demand balance adjustment portion 30 in view of a result of the optimum search processing. This processing is performed repetitively in the control cycle Tc.

In a series of the processing steps, whether the charge power Pbc(0) of the battery 24 is higher than zero is determined first at Step S20. This processing is to determine whether the battery 24 needs to be charged during a period from the current time until the control cycle Tc elapses in minimizing the cost. In other words, as shown by Equations (c2) and (c3) above, the optimum search processing makes a prediction over the prediction period, "t=0 to N·Tc", given "t=0" as the current time. Hence, the charge power Pbc(t) in the period from the current time until the control cycle Tc elapses in minimizing the target function Z is found to be charge power Pbc(0). When an affirmative determination is made at Step S20, advancement is made to Step S22 because charging the battery 24 is thought to be effective in saving the cost.

A guard value (charge upper limit guard value Icmax) of a charge current of the battery 24 is calculated and outputted to the supply and demand balance adjustment portion 30 at Step S22. Herein, the charge guard value is given to the supply and demand balance adjustment portion 30 instead of giving an instruction to charge the battery 24 with the charge power Pbc(0). The reason underling this configuration is to enable the supply and demand balance adjustment portion 30 to adjust a balance between supply and demand even when the prediction turns out to be incorrect.

Also, the charge upper limit guard value Icmax corresponding to the charge power Pbc(0) is given to the supply and demand balance adjustment portion 30 instead of giving the charge power Pbc(0) as the upper limit value. The reason underling this configuration is to make the supply and demand balance adjustment portion 30 independent of the specification of the battery 24 and therefore more versatile. In other words, a relation of an open circuit voltage (OCV) and a state of charge (SOC), internal resistance, an allowable range of the charge and discharge power, an allowable range of a charge and discharge current, and an allowable range of a terminal voltage of the battery 24 vary with specifications. Hence, by performing processing to set the appropriate charge upper limit guard value Icmax on the basis of such characteristic information of the battery 24 by the scheduler 50, the supply and demand balance adjustment portion 30 can be more versatile.

More specifically, the scheduler 50 calculates the charge upper limit guard value Icmax on the basis of the characteristic information of the battery 24 stored in the memory 52. The drawing shows an example in which the charge upper limit guard value Icmax is calculated by an equation as simple as finding the product of the open circuit voltage (OCV) understood from the state of charge of the battery 24 and the charge upper limit guard value Icmax to be the charge power Pbc(0). In short, a voltage drop amount caused by internal resistance and influences of polarization are ignored when the charge upper limit guard value Icmax is calculated in this example.

By the processing at Step S22, the battery-side command voltage Varef is assigned to a low-voltage side default value VL and the system-side command voltage Vbref is assigned to a high-voltage side default value VH and the battery-side command voltage Varef and the system-side command voltage Vbref are outputted to the supply and demand balance adjustment portion 30. This processing is to instruct the supply and demand balance adjustment portion 30 that the battery 24 needs to be charged.

The processing at Step S22 forms a guard value setting device and an output device in this embodiment.

On the contrary, when a negative determination is made at Step S20, advancement is made to Step S24 because discharging the battery 24 is thought to be effective in saving the cost.

A guard value (discharge upper limit guard value Idmax) of a discharge current determined by the discharge power Pbd(0) is calculated in the same manner as at Step S22 above and outputted to the supply and demand balance adjustment portion 30 at Step S24. Also, the battery-side command voltage Varef is assigned to a high-voltage side default value VH and the system-side command voltage Vbref is assigned to a low-voltage side default value VL and the battery-side command voltage Varef and the system-side command voltage Vbref are outputted to the supply and demand balance adjustment portion 30. This processing is to instruct the supply and demand balance adjustment portion 30 that the battery 24 needs to be discharged.

The processing at Step S24 forms the guard value setting device and the output device in this embodiment.

When the processing at Step S22 or Step S24 is completed, whether the command value Hp(0) exhibits "1" or not is determined at Step S26. This processing is to determine whether the heat pump 22 needs to be driven in a period from the current time until the control cycle Tc elapses in minimizing the cost. The processing at Step S26 forms a determination device in this embodiment. When an affirmative determination is made at Step S26, a drive signal Mh is outputted to the heat pump 22 at Step S28.

When the processing at Step S28 is completed or a negative determination is made at Step S26, a series of the processing steps is ended.

According to the processing as above, because the cost is minimized during the prediction period (assumed to be 24 hours herein) longer than the control cycle Tc by the processing depicted in FIG. 2 above, the guard value is updated in every control cycle Tc by the processing depicted in FIG. 3. In other words, although a prediction is made in every control cycle Tc over the prediction period longer than the control cycle Tc, the setting of the guard value on the basis of this prediction is limited to the period of the control cycle Tc and the guard value is set anew in the following control cycle Tc on the basis of a new prediction result. Herein, the control cycle Tc is made shorter than the prediction period of model prediction control as above. The reason underlying this configuration is to increase robustness against a prediction error in the prediction processing and a modeling error in the optimum search processing. Incidentally, a prediction error can be lessened also by making the prediction period itself shorter. In this case, however, an optimum solution in a microscopic time scale is searched for by the optimum search processing and this optimum solution is not necessarily an optimum solution in a large time scale.

Further, by giving the guard value from the scheduler 50 to the supply and demand balance adjustment portion 30, a balance between supply and demand can be maintained even in the event of a prediction error. This point will be described in the following.

Figure 4:
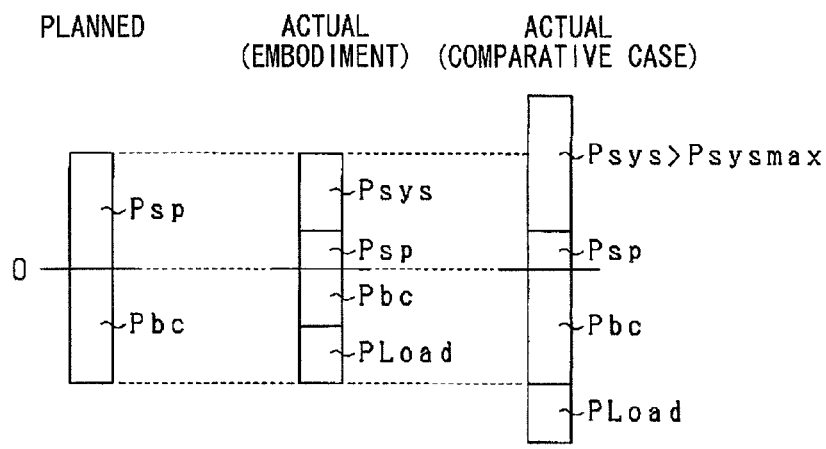
FIG. 4 is a view showing advantages of the first embodiment.

FIG. 4 shows, by way of the above optimum search processing, a case where actual generation power Psp falls under the prediction and power is consumed unexpectedly by the load 44 under circumstances in which covering the charge power Pbc by the generation power Psp of the solar panel 20 (denoted as "planned" in the drawing) is determined to be optimum. In this case, because the generation power Psp is so small that the voltage Vhvdc across the DC bus line 32 drops with charging of the battery 24 and power consumption by the load 44 and the actual charge power Pbc becomes lower than the charge power Pbc(0). Further, the voltage Vhvdc drops below the system-side command voltage Vbref. Accordingly, the power Psys of the system power supply 26 is supplied.

On the contrary, in a comparative case where the charge power Pbc itself is given to the supply and demand balance adjustment portion 30 as a command value, the power Psys required for the system power supply 26 in covering the power demand may possibly exceed the contractual upper limit value Psysmax.

Figure 5:
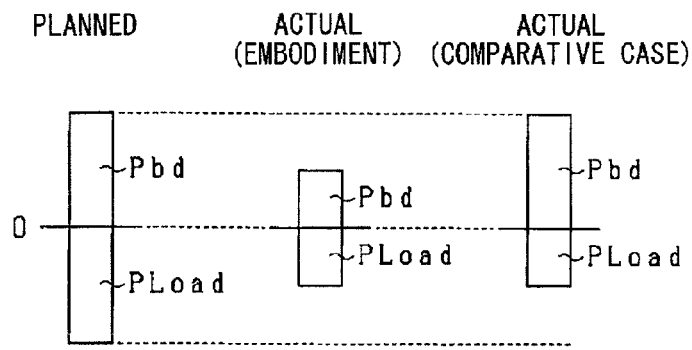
FIG. 5 is another view showing advantages of the first embodiment.

FIG. 5 shows, by way of the above optimum search processing, a case where the power PLoad actually consumed by the load 44 is small under circumstances in which covering the power PLoad consumed by the load 44 by the discharge power Pbd of the battery 24 (denoted as "planned" in the drawing) is determined to be optimum. In this case, in a case where the discharge power Pbd of the battery 24 becomes surplus because power consumed by the load 44 is small, a voltage across the DC bus line 32 rises in this embodiment. Hence, a voltage difference between the battery-side command voltage Varef and the voltage Vhvdc across the DC bus line 32 becomes smaller and the discharge power Pbd of the battery 24 therefore becomes smaller than the discharge power Pbd(0) in the optimum search processing.

On the contrary, in a comparative case where the discharge power Pbd(0) itself is given to the supply and demand balance adjustment portion 30 as a command value, control is performed so as to keep the discharge power Pbd(0) by increasing the output voltage Va across the DCDC converter 38.

Figure 6:
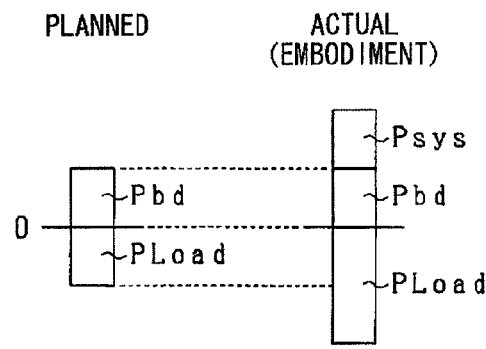
FIG. 6 is still another view showing advantages of the first embodiment.

FIG. 6 shows, by way of the above optimum search processing, a case where the power PLoad actually consumed by the load 44 is large under circumstances in which covering the power PLoad consumed by the load 44 by the discharge power Pbd of the battery 24 (denoted as "planned" in the drawing) is determined to be optimum. In this case, because the upper limit guard processing is applied by giving the discharge power Pbd(0) determined by the optimum search processing as the upper limit value in this embodiment, the discharge power Pbd of the battery 24 is found to be the discharge power Pbd(0). Because power consumed by the load 44 is so large that the voltage Vhvdc across the DC bus line 32 drops and falls under the system-side command voltage Vbref, power of the system power supply 26 is provided to maintain a balance between supply and demand. Incidentally, the voltage Vhvdc across the DC bus line 32 when power is supplied by the system power supply 26 is lower than the battery-side command voltage Varef assigned to the high-voltage side default value VH. In this embodiment, however, because the discharge upper limit guard value Idmax of the discharge current is given, the discharge power Pbd of the battery 24 is prevented from exceeding the guard value (Pbd(0)).

Figure 7:
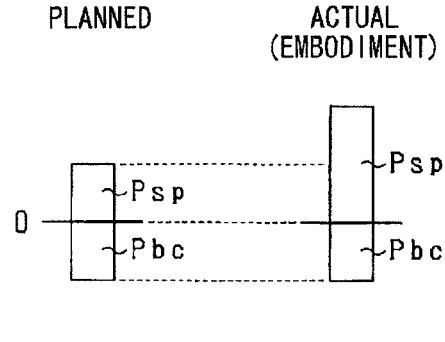
FIG. 7 is still another view showing advantages of the first embodiment.

FIG. 7 shows, by way of the above optimum search processing, a case where the generation power Psp is unexpectedly large under circumstances in which charging the generation power Psp of the solar panel 20 to the battery 24 (denoted as "planned" in the drawing) is determined to be optimum. Even in this case, the charge power Pbc of the battery 24 is found to be the charge power Pbc(0) because the upper limit guard processing is applied using the charge power Pbc(0) determined by the optimum search processing as the upper limit value. A surplus of the generation power Psp can be flown inversely through the system inverter 36.

Some of the advantages of this embodiment will be described in the following.

(1) The scheduler 50 searches for an optimum value of the charge and discharge power of the battery 24 on the basis of the prediction processing and gives the guard value corresponding to the optimum value to the supply and demand balance adjustment portion 30. This configuration enables the supply and demand balance adjustment portion 30 to maintain a balance between supply and demand so that appropriate charge and discharge power is obtained in a time scale subject to prediction. Moreover, because a command content given to the supply and demand balance adjustment portion 30 is in the form of the guard value, even in the event of an error in the prediction processing, the supply and demand balance adjustment portion 30 can flexibly address the error.

(2) A command as to whether the battery 24 needs to be charged or discharged is given to the supply and demand balance adjustment portion 30 depending on whether the optimum value of the charge and discharge power of the battery 24 is a value on the charge side or the discharge side. This configuration enables the supply and demand balance adjustment portion 30 to acquire information as to which of either charging or discharging of the battery 24 is to be performed in saving the cost in a time scale subject to prediction.

(3) The system is configured in such a manner that the supply and demand balance adjustment portion 30 includes the DC bus line 32 so as to understand a balance between supply and demand on the basis of the voltage Vhvdc across the DC bus line 32 and adjusts an output of the system inverter 36 and an output of the DCDC converter 38 on the basis of the balance between supply and demand. This configuration enables the supply and demand balance adjustment portion 30 to adjust a balance between supply and demand without having to perform information communications and collaborative control among the involved control device of the power (the system inverter 36, the DCDC converter 38, and the solar converter 34).

(4) The battery-side command voltage Varef and the system-side command voltage Vbref are outputted to the supply and demand balance adjustment portion 30 by setting a relation as to which is the higher or the lower depending on whether the battery 24 needs to be charged or discharged. This configuration enables the supply and demand balance adjustment portion 30 to maintain a balance between supply and demand on the basis of the battery-side command voltage Varef and the system-side command voltage Vbref given thereto.

(5) The guard value of the charge and discharge power of the battery 24 is set in order to minimize the cost incurred by supplying power from the system power supply 26. Owing to this configuration, the cost incurred within the system 10 can be minimized and an amount of usage of renewable energy can be increased.

(6) The solar panel 20 (unstable supply device) is provided within the system 10. Hence, because an amount of power that can be supplied into the system 10 cannot be determined in advance, the use of the setting processing of the guard value of the charge and discharge power of the battery 24 on the basis of the prediction processing is of particularly high value.

(7) The prediction processing, the optimum search processing, and the guard value setting processing are performed in every prediction cycle (control cycle Tc) shorter than the prediction period (0 to N·Tc). Owing to this configuration, the robustness against a prediction error and a modeling error can be enhanced while the optimum search processing is performed in a relatively long time scale.

(8) The system 10 includes the transmission device (line L2) for transmitting power to the commercial vehicle 28. In this case, it is often difficult to preliminary understand timing at which to supply power to the outside of the system 10. Hence, it is particularly effective to perform the prediction processing.

(9) When the optimum search processing is performed, the lower limit value Bmin(t) of a charge amount of the battery 24, down to the extent to which the battery 24 can cover the charge power Pv of the commercial vehicle 28, is set. Owing to this configuration, a request of the commercial vehicle 28 can be satisfied in a reliable manner.

(10) The charge upper limit guard value Icmax (discharge upper limit guard value Idmax) is given to the supply and demand balance adjustment portion 30 as the guard value of the charge and discharge power of the battery 24. This configuration eliminates a need to furnish the supply and demand balance adjustment portion 30 with a function of storing characteristic information corresponding to the specification of the battery 24 and therefore can make the supply and demand balance adjustment portion 30 more versatile.

(11) The optimum value searching processing is formulated as a mixed integer programming problem. Owing to this configuration, not only can two-valued operations, such as activating and stopping the heat pump 22, can be handled, but also construction of an if-then-else logic can be avoided.

Second Embodiment

Hereinafter, a second embodiment will be described with reference to the drawings by focusing on a difference from the first embodiment above.

Figure 8:
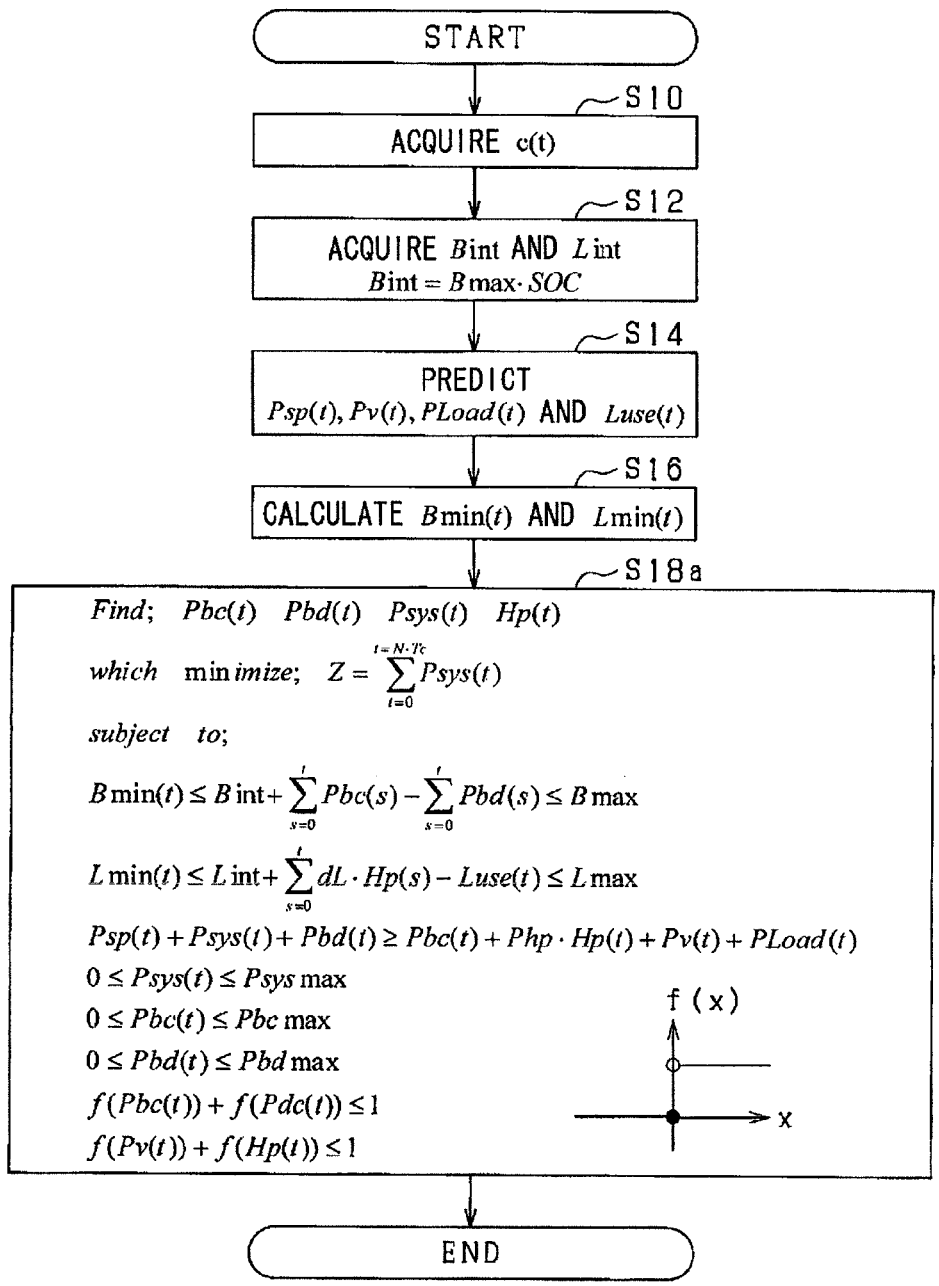
FIG. 8 is a flowchart depicting a procedure of optimum search processing in a second embodiment.

FIG. 8 shows optimum search processing of this embodiment. This processing is performed repetitively in a control cycle Tc (assumed to be one hour herein). Of the processing steps shown in FIG. 8, the processing steps corresponding to those shown in FIG. 2 described above are labeled with the same step numbers for ease of description.

As shown in the drawing, this embodiment is configured so as to search for charge power Pbc(t), discharge power Pbd(t), power Psys(t), and an operation command value Hp(t) of the heat pump 22 to minimize an object function Z in Equation (c10) below at Step S18a.

[Mathematical Formula 2]

$$Z = \sum_{t=0}^{t=N \cdot Tc} Psys(t) \qquad (c10)$$

In short, this embodiment considers minimizing power Psys(t) of the system power supply 26 and aims at maximizing an amount of usage of generation power Psp of the solar panel 20 as renewable energy. A purpose of this embodiment is to promote so-called local production for local consumption within the system 10 by covering power required by the demand device by the power generated within the system 10 to the extent possible more than in the first embodiment above.

Incidentally, in a case where the system power supply 26 is thermal power generation equipment or the like, the embodiment aims at utilizing $CO_2$ free energy to the maximum extent possible.

Other Embodiments

It should be appreciated that the respective embodiments above may be modified as follows.

Free Supply Device

The free supply device is not limited to the solar panel 20. For example, the free supply device may be a wind power generator. Further, the free supply device is not limited to such a weather-dependent generation device that depends on weather, either. For example, in a case where power left unused on the outside of the system 10 is provided free of charge, the free supply device may be an input device of this free power. Even in this case, the free supply device may be an unstable supply device with which an amount of power it can supply cannot be determined in advance as long as the provision of the free power is not notified in advice for a period subject to prediction in future.

It should be noted that the free supply device itself is not an essential constituent component. Even in a case where the free supply device is absent, it is effective to provide a prediction device for predicting power consumption of the demand device in minimizing a total cost of power, for example, as long as the power costs of the system power supply fluctuate time-dependently.

Paid Supply Device

The paid supply device is not limited to the introduction device (line L1) for introducing power into the system 10 from the system power supply 26. For example, the paid supply device may be a fuel cell or an in-house power generator that generates power using fossil fuel or the like. Even in this case, fuel within the system 10 is consumed by consuming power and the cost is incurred to replenish the fuel. Hence, the fuel cell and the in-house power generator are a paid supply device.

Renewable Energy Using Device

As described in the column, "Free Supply Device", the weather-dependent generation device is not limited to the solar panel 20 and may be a wind power generator or the like.

Also, the renewable energy using device is not limited to the weather-dependent generation device and may include, for example, a geothermal power generator. Even in this case, it is effective to increase an amount of usage of power supplied from the renewable energy using device in promoting local production for local consumption.

Prediction Device

The prediction period is not necessarily longer than an update cycle of the guard value. For example, the former and the latter may be equal.

The prediction device is not limited to the one described in the embodiments above by way of example. For example, the power Road consumed by the load 44 may be a sum of an average value of the same days of the week and a standard deviation instead of a sum of an average value of several days in the past and a standard deviation. Alternatively, the prediction value may be two values including "average value−standard deviation" and "average value+standard deviation", or three values further including the average value itself instead of a sum of the average value and a standard deviation. In this case, it may be configured in such a manner that the optimum value calculation device searches for an optimum value that is searched for with every prediction value, so that a final optimum value is found to be a simple average value or a weighted average value of the respective optimum values.

Processing to predict power consumption of the demand device may not be performed according to each variable as it is inputted. In other words, it may be configured in such a manner that, for example, future power consumption on the demand side is given as a default value and a result of the prediction processing on the generation power Psp of the solar panel 20 is used in maximizing use efficiency of the generation power Psp of the solar panel 20 or in minimizing the power costs.

A need to predict supply power of the supply device can be eliminated as described in the column, "Free Supply Device".

Optimum Value Calculation Device (S18 and S18a)

The optimum value calculation device is not limited to those described in the first embodiment (FIG. 2) and the second embodiment (FIG. 8) above by way of example. For example, it may be configured in such a manner that an evaluation is raised higher as the power costs become lower and an amount of usage of renewable energy becomes larger and also a solution with which evaluation becomes the highest is found to be the optimum value.

For example, in a case where power consumption while the heat pump 22 is in operation can be varied in several steps or continuously, an integer variable is omitted from an equation expressing the constraint condition. It should be noted, however, that even in this case, it is effective to formulate a mixed integer programming problem in order to avoid construction of an if-then-else logic.

The optimum value calculation device, however, is not limited to the one using the mixed integer programming as the linear programming. Further, the optimum value calculation device is not limited to the one using the linear programming as an integer programming problem, either.

Cost c(t)

The cost of the system power supply 26 is not limited to the one that fluctuates on a 24-hour basis. For example, in a case where so-called dynamic pricing by which the electrical charges are increased at the peak of power demand is adopted, the cost may reflect such an increase. Further, in a case where the cost c(t) fluctuates with weather or the like, the cost cannot be determined in advance in this case. Hence, the cost may also be subject to prediction.

Output Device (S22 and S24)

The output device is not limited to the one that outputs the charge upper limit guard value Icmax or the discharge upper limit guard value Idmax and may be configured so as to output an upper limit guard value of the charge power or an upper limit guard value of the discharge power. In this case, however, it should be noted that the supply and demand balance adjustment portion 30 includes the storage device (memory 52) for storing characteristic information of the battery 24.

In the embodiments above, the battery-side command voltage Varef and the system-side command voltage Vbref are assigned to the high-voltage side default value VH and the low-voltage side default value VL, respectively. However, the disclosure is not limited to this configuration. It may be configured in such a manner that, for example, the system-side command voltage Vbref is fixed and whether the system-side command voltage Vbref has a larger value or a smaller value than a battery-side threshold voltage Vbth is set depending on which of either charging or discharging of the battery 24 is performed with a higher priority.

In addition, the battery-side command voltage Varef and the system-side command voltage Vbref are not limited to default values. For example, these voltages may be set so as to vary step-by-step in at least two steps or vary continuously according to the charge power Pbc(0), the discharge power Pbd(0), and the power Psys(0).

A command instructing whether the battery 24 needs to be charged or discharged is not limited to an output of the battery-side command voltage Varef and the system-side command voltage Vbref. For example, it may be configured in such a manner that a command instructing that the battery 24 needs to be charged is given by outputting the charge upper limit guard value Icmax and a command instructing that the battery 24 needs to be discharged is given by outputting the discharge upper limit guard value Idmax. In this case, the supply and demand balance adjustment portion 30 sets the battery-side command voltage Varef to a value smaller than the system-side command voltage Vbref at a command instructing that the battery 24 needs to be charged and sets the battery-side command voltage Varef to a value larger than the system-side command voltage Vbref at a command instructing that the battery 24 needs to be discharged.

Supply and Demand Balance Adjustment Portion

The supply and demand balance adjustment portion is not limited to the one that makes relative magnitude of the battery-side command voltage Varef and the system-side command voltage Vbref variable according to a command instructing that the battery 24 needs to be charged or discharged. For example, the supply and demand balance adjustment portion may be configured so as not to discharge the battery 24 regardless of a value of the voltage Vhvdc across the DC bus line 32 when the command instructs that the battery 24 needs to be charged.

The supply and demand balance adjustment portion is not limited to the one that includes the DC bus line 32. Even in a case where the DC bus line 32 is absent, the adjustment portion can be formed in such a manner that, for example, the load 44, the line L2, and the heat pump 22 are provided as a demand device on the demand side and power required by the demand device is covered by the generation power of the solar panel 20, power of the system power supply 26, and discharge power of the battery 24. In this case, when the scheduler 50 gives a command instructing whether the battery 24 needs to be charged or discharged in addition to the guard value, the supply and demand balance adjustment portion 30 becomes able to perform the charge and discharge control according to a long-term time scale. Even in this case, for example, by instructing that the battery 24 needs to be discharged when power required by the load 44 is covered and giving the guard value of the discharge power, even in a case where the power consumption PLoad of the load 44 falls under the prediction as shown, for example, in FIG. 5, such a discrepancy can be addressed appropriately. Likewise, as shown in FIG. 6, in a case where the power consumption PLoad of the load 44 surpasses the prediction, an event that the battery 24 is over-discharged can be avoided. Also, in a case where the supply and demand balance adjustment portion 30 is furnished with a function of charging the generation power Psp of the solar panel 20 into the battery 24 at a command instructing that the battery 24 needs to be charged, when the generation power Psp of the solar panel 20 falls under the prediction as shown in FIG. 4 described above, the charge power of the battery 24 can be reduced from the planned value (guard value) and no inconsistency occurs between an operation of the supply and demand balance adjustment portion 30 and the command from the scheduler 50.

Mobile Object

The mobile object is not limited to the commercial vehicle 28 and may be an ordinary passenger car. Even in this case, the mobile object can be a destination to which power from the system 10 flows out in a case where the mobile object includes a rotating machine as an in-vehicle main machine and a reservoir device for reserving electrical energy supplied to the rotating machine.

Conversion Device (22)

The conversion device is not limited to the one that performs two-valued operations: an activation and a stop as described in the column, "Optimum Value Calculation Device".

Conversion of power to thermal energy is not limited to conversion by raising a temperature of water. For example, power may be converted to thermal energy by raising a temperature of oil.

System 10

The system 10 may be, for example, a system equipped to a house or a system installed within a plant. Components forming the system 10 are not limited to those shown in FIG. 1 as described in the columns, "Free Supply Device" and "Paid Supply Device".

Capacitor Device

The secondary battery is not limited to a lithium-ion secondary battery and may be a nickel-hydrogen secondary battery. The capacitor device is not limited to a secondary battery, either, and may be a capacitor.

Reverse Power Flow

In a case where power can be sold for a price by reverse power flow, the cost saving plan may be designed in consideration of selling rate of power in such a case.

The above disclosure has the following aspects.

According to an example aspect of the present disclosure, a power control apparatus includes: a power supply device for supplying an electric power, the power supply device including a plurality of power supply elements; a power consumption device for consuming the electric power; a battery independently arranged from the power supply device and the power consumption device; a supply and consumption balance adjustment device for controlling the power supply device and the battery to supply the electric power to the power consumption device; a prediction device for predicting at least one of electric power supply from at least a part of the plurality of power supply elements and electric power consumption of the power consumption device; a guard value setting device for setting a guard value of a charging and discharging operation of the battery according to a prediction result of the prediction device; and an output device for outputting the guard value to the supply and consumption balance adjustment device.

In the above apparatus, by providing the prediction device, the guard value setting device, and the output device, even in a case where the supply and consumption balance adjustment device itself understands information in a microscopic time scale alone, such as current values of power that can be supplied by the power supply device, power that needs to be supplied to the consumption device, and a charge amount of the battery, the supply and consumption balance adjustment device can make an adjustment of power that is appropriate in a scale of a prediction period of the prediction device. It should be noted that in a case where a value itself that thought to be appropriate on the basis of a result of the prediction device is indicated to the supply and consumption balance adjustment device as a charge and discharge amount of the battery, there is a risk that a balance between supply and consumption cannot be maintained due to a discrepancy between the result of the prediction and the actual value. In this regard, however, the apparatus can avoid such an inconvenience by giving a command value of the charge and discharge power to the supply and consumption balance adjustment device as the guard value.

Alternatively, the guard value setting device may include an optimum value search device for determining an optimum value of the charging and discharging operation of the battery according to the prediction result of the prediction device. The guard value includes a charging guard value and a discharging guard value. The guard value setting device sets the charging guard value when the optimum value determined by the optimum value search device relates to a charging operation of the battery, and the guard value setting device sets the discharging guard value when the optimum value determined by the optimum value search device relates to a discharging operation of the battery. The output device further outputs a command to the supply and consumption balance adjustment device, the command instructing, according to the optimum value, whether the electric power is to be charged in the battery or to be discharged from the battery. The supply and consumption balance adjustment device prioritizes supplying the electric power from the power supply device to the power consumption device when the command instructs that the electric power is to be charged in the battery. The supply and consumption balance adjustment device prioritizes supplying the electric power from the battery to the power consumption device when the command instructs that the electric power is to be discharged from the battery. Further, the power supply device, the battery and the power consumption device may exchange the electric power via a common direct current line. The supply and consumption balance adjustment device determines based on a voltage of the direct current line whether the electric power to be supplied to the power consumption device is short. The supply and consumption balance adjustment device controls an amount of the electric power supply from the power supply device and an amount of the charging and discharging operation of the battery, according to a determination result of the supply and consumption balance adjustment device.

Alternatively, the plurality of power supply elements may include a paid power supply element that requires a cost when the paid power supply element supplies the electric power to the power consumption device; and the optimum value search device calculates the optimum value of the charging and discharging operation of the battery based on the prediction result of the prediction device in order to reduce the cost to be required by the paid power supply element. Further, the paid power supply element may include an introduction device for introducing the electric power from a system power supply.

Alternatively, the plurality of power supply elements may include a renewable energy using element for generating the electric power using renewable energy; and the optimum value search device calculates the optimum value of the charging and discharging operation of the battery based on the prediction result of the prediction device in order to increase a usage amount of the electric power supplied from the renewable energy using element.

Alternatively, the plurality of power supply elements may include an unstable power supply element, of which an available amount of electric power supply is not preliminarily determined. The prediction device predicts the electric power supply from the unstable power supply element.

Alternatively, the prediction device may predict during a prediction period having a predetermined time length at predetermined time intervals, which are shorter than the predetermined time length. The guard value setting device updates the guard value according to the prediction result performed at predetermined time intervals. The output device outputs an updated guard value to the supply and consumption balance adjustment device when the guard value is updated. Further, the power consumption device may include a transmission element for transmitting the electric power to a mobile object. Furthermore, the guard value setting device may set the guard value so as to become a charging rate of the battery to be equal to or higher than a lower limit value of the charging rate of the battery. The lower limit value is a minimum required electric power for supplying the electric power to the mobile object via the transmission device from the battery.

Alternatively, the power control apparatus may further include: a storage device for storing characteristic information of the battery. The guard value setting device sets a guard value of a charging and discharging current of the battery as the guard value of the charging and discharging operation of the battery, according to the characteristic information.

Alternatively, the power consumption device may include a conversion device for converting the electric power to thermal energy. The guard value setting device includes a determination device for determining based on the prediction result whether the conversion device converts the electric power; and the output device outputs a command signal to the conversion device in accordance with a determination result of the determination device.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A power control apparatus comprising:
  a power supply device for supplying an electric power, the power supply device including a plurality of power supply elements;
  a power consumption device for consuming the electric power;
  a battery independently arranged from the power supply device and the power consumption device;
  a supply and consumption balance adjustment device for controlling the power supply device and the battery to supply the electric power to the power consumption device;
  a prediction device for predicting at least one of electric power supply from at least a part of the plurality of power supply elements and electric power consumption of the power consumption device;
  a guard value setting device for setting a guard value of a charging and discharging operation of the battery according to a prediction result of the prediction device; and
  an output device for outputting the guard value to the supply and consumption balance adjustment device, wherein
  the guard value setting device includes an optimum value search device for determining an optimum value of the charging and discharging operation of the battery according to the prediction result of the prediction device;
  the guard value includes a charging guard value and a discharging guard value; and
  the guard value setting device sets the charging guard value when the optimum value determined by the optimum value search device relates to a charging operation of the battery, and the guard value setting device sets the discharging guard value when the optimum value determined by the optimum value search device relates to a discharging operation of the battery.

2. The power control apparatus according to claim 1, wherein:
  the output device further outputs a command to the supply and consumption balance adjustment device, the command instructing, according to the optimum value, whether the electric power is to be charged in the battery or to be discharged from the battery;
  the supply and consumption balance adjustment device prioritizes supplying the electric power from the power supply device to the power consumption device when the command instructs that the electric power is to be charged in the battery; and
  the supply and consumption balance adjustment device prioritizes supplying the electric power from the battery to the power consumption device when the command instructs that the electric power is to be discharged from the battery.

3. The power control apparatus according to claim 2, wherein:
  the power supply device, the battery and the power consumption device exchange the electric power via a common direct current line;
  the supply and consumption balance adjustment device determines based on a voltage of the direct current line whether the electric power to be supplied to the power consumption device is short; and
  the supply and consumption balance adjustment device controls an amount of the electric power supply from the power supply device and an amount of the charging and discharging operation of the battery, according to a determination result of the supply and consumption balance adjustment device.

4. The power control apparatus according to claim 2, wherein:
  the plurality of power supply elements includes a paid power supply element that requires a cost when the paid power supply element supplies the electric power to the power consumption device; and the optimum value search device calculates the optimum value of the charging and discharging operation of the battery based on the prediction result of the prediction device in order to reduce the cost to be required by the paid power supply element.

5. The power control apparatus according to claim 4, wherein:
the paid power supply element includes an introduction device for introducing the electric power from a system power supply.

6. The power control apparatus according to claim 2, wherein:
the plurality of power supply elements includes a renewable energy using element for generating the electric power using renewable energy; and
the optimum value search device calculates the optimum value of the charging and discharging operation of the battery based on the prediction result of the prediction device in order to increase a usage amount of the electric power supplied from the renewable energy using element.

7. The power control apparatus according to claim 1, wherein:
the plurality of power supply elements includes an unstable power supply element, of which an available amount of electric power supply is not preliminarily determined; and
the prediction device predicts the electric power supply from the unstable power supply element.

8. The power control apparatus according to claim 1, wherein:
the prediction device predicts during a prediction period having a predetermined time length at predetermined time intervals, which are shorter than the predetermined time length;
the guard value setting device updates the guard value according to the prediction result performed at predetermined time intervals; and
the output device outputs an updated guard value to the supply and consumption balance adjustment device when the guard value is updated.

9. The power control apparatus according to claim 1, wherein:
the power consumption device includes a transmission element for transmitting the electric power to a mobile object.

10. The power control apparatus according to claim 9, wherein:
the guard value setting device sets the guard value so as to become a charging rate of the battery to be equal to or higher than a lower limit value of the charging rate of the battery; and
the lower limit value is a minimum required electric power for supplying the electric power to the mobile object via the transmission element from the battery.

11. The power control apparatus according to claim 1, further comprising:
a storage device for storing characteristic information of the battery, wherein:
the guard value setting device sets a guard value of a charging and discharging current of the battery as the guard value of the charging and discharging operation of the battery, according to the characteristic information.

12. The power control apparatus according to claim 1, wherein:
the power consumption device includes a conversion device for converting the electric power to thermal energy;
the guard value setting device includes a determination device for determining based on the prediction result whether the conversion device converts the electric power; and
the output device outputs a command signal to the conversion device in accordance with a determination result of the determination device.

13. The power control apparatus according to claim 1, wherein:
the supply and consumption balance adjustment device controls an amount of the electric power supply from the power supply device and an amount of the charging and discharging operation of the battery, according to a determination result of the supply and consumption balance adjustment device.

14. The power control apparatus according to claim 1, wherein:
the charging guard value is a charge upper limit guard value; and
the discharging guard value is a discharge upper limit guard value.

15. The power control apparatus according to claim 14, wherein:
a discharge power of the battery does not exceed the guard value when the guard value setting device sets the discharge upper limit guard value.

* * * * *